(12) United States Patent
Sebastian et al.

(10) Patent No.: US 8,010,705 B1
(45) Date of Patent: Aug. 30, 2011

(54) METHODS AND SYSTEMS FOR UTILIZING DELTA CODING IN ACCELERATION PROXY SERVERS

(75) Inventors: William B. Sebastian, Quincy, MA (US); Michael Maniscalco, Melrose, MA (US)

(73) Assignee: Viasat, Inc., Carlsbad, CA (US)

( * ) Notice: Subject to any disclaimer, the term of this patent is extended or adjusted under 35 U.S.C. 154(b) by 155 days.

(21) Appl. No.: 12/477,814

(22) Filed: Jun. 3, 2009

Related U.S. Application Data

(60) Provisional application No. 61/058,857, filed on Jun. 4, 2008.

(51) Int. Cl.
*G06F 15/16* (2006.01)
*G06F 17/00* (2006.01)

(52) U.S. Cl. .............. 709/247; 709/234; 707/999.204; 715/234

(58) Field of Classification Search .......... None
See application file for complete search history.

(56) References Cited

U.S. PATENT DOCUMENTS

| | | | |
|---|---|---|---|
| 7,340,510 B1 | 3/2008 | Liskov et al. | |
| 2005/0010870 A1 | 1/2005 | Gu et al. | |
| 2006/0112264 A1* | 5/2006 | Agarwal | 713/150 |
| 2006/0253444 A1 | 11/2006 | O'Toole et al. | |
| 2008/0115125 A1* | 5/2008 | Stafford et al. | 718/1 |
| 2008/0205396 A1 | 8/2008 | Dakshinamoorthy et al. | |
| 2008/0235090 A1 | 9/2008 | Lundstrom et al. | |
| 2009/0006368 A1 | 1/2009 | Mei et al. | |
| 2009/0187673 A1* | 7/2009 | Ramjee et al. | 709/247 |
| 2010/0177642 A1 | 7/2010 | Sebastian et al. | |
| 2010/0179984 A1 | 7/2010 | Sebastian | |
| 2010/0179986 A1 | 7/2010 | Sebastian et al. | |
| 2010/0179987 A1 | 7/2010 | Sebastian et al. | |
| 2010/0180046 A1 | 7/2010 | Sebastian et al. | |
| 2010/0185730 A1 | 7/2010 | Sebastian | |
| 2010/0232431 A1 | 9/2010 | Sebastian | |

FOREIGN PATENT DOCUMENTS

| | | |
|---|---|---|
| WO | WO 01/61886 A2 | 8/2001 |
| WO | WO 01/84777 A2 | 11/2001 |
| WO | WO 02/41527 A1 | 5/2002 |
| WO | WO 2007/051079 A2 | 5/2007 |
| WO | WO 2008/070614 A2 | 6/2008 |

OTHER PUBLICATIONS

U.S. Appl. No. 12/684,648, filed Jan. 8, 2010.
Frantzeskou et al., "Effective Identification of Source Code Authors Using Byte-Level Information," ACM, New York, USA, May 20-28, 2006, pp. 893-896, XP040040085 Shanghai, China.
International Search Report for PCT Application No. PCT/US2010/020897, mailed Aug. 16, 2010.
International Search Report for PCT Application No. PCT/US2010/020940, mailed Sep. 22, 2010.
International Search Report for PCT Application No. PCT/US2010/026788, mailed Oct. 13, 2010.

* cited by examiner

*Primary Examiner* — Wen-Tai Lin

(74) *Attorney, Agent, or Firm* — Kilpatrick Townsend & Stockton LLP

(57) ABSTRACT

The present invention relates to systems, apparatus, and methods of utilizing delta coding in acceleration proxy servers. The method including storing, at a proxy server, a plurality of dictionary pages within a page storage disk and indexing, at the proxy server, the plurality of dictionary pages with fingerprint identifiers. The fingerprint identifiers are configured to uniquely identify data strings within each of the plurality of dictionary pages. The method further includes receiving, at the proxy server, a data request. The request includes a plurality of fingerprints associated with the requested data.

20 Claims, 11 Drawing Sheets

METHODS AND SYSTEMS FOR UTILIZING DELTA CODING IN ACCELERATION PROXY SERVERS

PRIORITY CLAIM

This application claims priority to U.S. Provisional Application No. 61/058,857, entitled METHODS AND SYSTEMS FOR UTILIZING DELTA CODING IN ACCELERATION PROXY SERVERS, filed on Jun. 4, 2008, which is incorporated by reference in its entirety for any and all purposes.

FIELD OF THE INVENTION

The present invention relates, in general, to network acceleration and, more particularly, to utilizing delta coding in acceleration proxy servers.

BACKGROUND

Typically, a dictionary coder will receive raw data in to encode, encode the data based on the selected dictionary, and them output encoded data. Unfortunately, such a scheme fails to take full advantage of the capabilities of such encoding in the context of network acceleration and performance enhancement. Thus, improvements in the art are needed.

BRIEF SUMMARY

Embodiments of the present invention are directed to a method of utilizing delta coding in acceleration proxy servers. The method including storing, at a proxy server, a plurality of dictionary pages within a page storage disk and indexing, at the proxy server, the plurality of dictionary pages with fingerprint identifiers. The fingerprint identifiers are configured to uniquely identify data strings within each of the plurality of dictionary pages. The method further includes receiving, at the proxy server, a data request. The request includes a plurality of fingerprints associated with the requested data.

Further, the method includes searching, at the proxy server, the indexed fingerprint identifiers for matches with the plurality of fingerprints associated with the requested data, identifying, at the proxy server, one of the plurality of pages with the greatest number of matching fingerprints from the plurality of fingerprints associated with the requested data, and removing, at the proxy server, the fingerprints associated with the one of the plurality of pages from the searching of the indexed fingerprints. Further, the method includes searching, at the proxy server, the indexed fingerprint identifiers for matches with the remaining plurality of fingerprints associated with the requested data, and loading, at a client through a proxy client, the identified pages into memory.

Another embodiment is directed to a system for utilizing delta coding in acceleration proxy servers. The system includes a proxy server configured to store a plurality of dictionary pages within a page storage disk and index the plurality of dictionary pages with fingerprint identifiers. The fingerprint identifiers are configured to uniquely identify data strings within each of the plurality of dictionary pages. The proxy server is further configured to receive a data request. The request includes a plurality of fingerprints associated with the requested data.

Furthermore, the proxy server is configured to search the indexed fingerprint identifiers for matches with the plurality of fingerprints associated with the requested data, identify one of the plurality of pages with the greatest number of matching fingerprints from the plurality of fingerprints associated with the requested data, and remove the fingerprints associated with the one of the plurality of pages from the searching of the indexed fingerprints. Further, the proxy server is configured to search the indexed fingerprint identifiers for matches with the remaining plurality of fingerprints associated with the requested data. The system also includes a client which includes a proxy client which is in communication with the proxy server. The proxy client is configured to load the identified pages into memory and render the loaded page.

In an alternative embodiment, a machine-readable medium is described. The machine-readable medium includes instructions for storing a plurality of dictionary pages within a page storage disk, and indexing the plurality of dictionary pages with fingerprint identifiers. The fingerprint identifiers are configured to uniquely identify data strings within each of the plurality of dictionary pages. The machine-readable medium further includes instructions for receiving a data request. The request includes a plurality of fingerprints associated with the requested data.

The machine-readable medium further includes instructions for searching the indexed fingerprint identifiers for matches with the plurality of fingerprints associated with the requested data, identifying one of the plurality of pages with the greatest number of matching fingerprints from the plurality of fingerprints associated with the requested data, and removing the fingerprints associated with the one of the plurality of pages from the searching of the indexed fingerprints. Furthermore, the machine-readable medium includes instructions for searching the indexed fingerprint identifiers for matches with the remaining plurality of fingerprints associated with the requested data, and loading the identified pages into memory.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

Aspects of the invention relate to utilizing delta coding with network acceleration. One process of accelerating network traffic includes encoding and decoding data transferred across a transmission medium. One compression technique includes delta coding. The present invention relates to modified delta coding which enhances network acceleration. Aspects of this modified delta coding include increasing dictionary block size, page alignment on file boundaries, best match fingerprint comparisons, and shared dictionaries. These aspects as well as other aspects of the invention will be discussed in more detail below.

Figure 1:
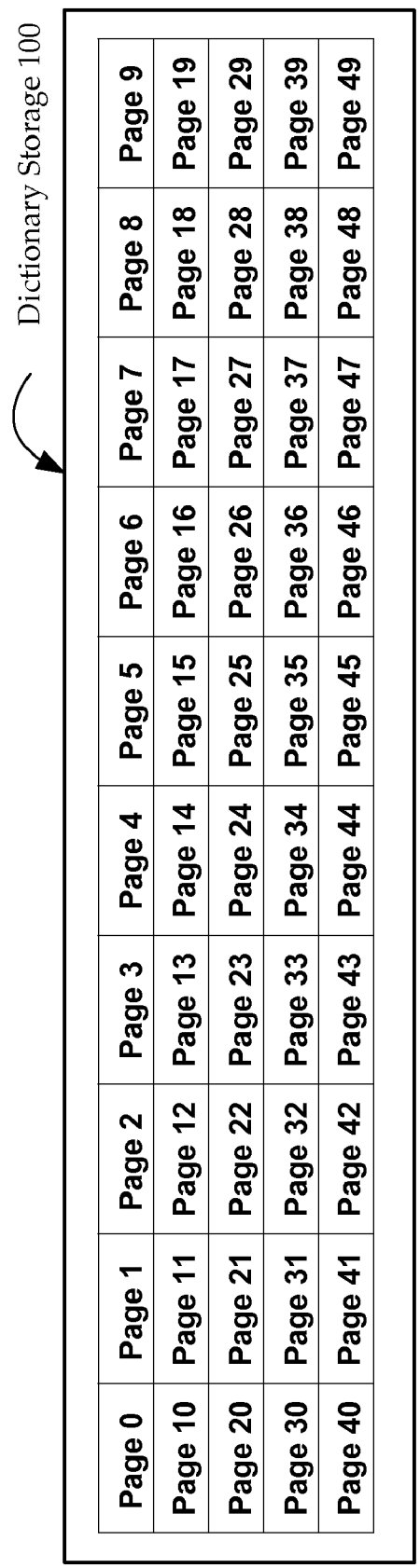
FIG. 1 is a block diagram illustrating a dictionary storage, according to embodiments of the present invention.

Turning now to FIG. 1, which illustrates a dictionary storage 100. In one embodiment, dictionary storage 100 includes fifty pages; however, the use of fifty pages is merely for exemplary purposes, and additional or fewer pages may be used. Each page may be assigned a page size, for example, 1 megabyte (MB) per page. Nonetheless, other page sizes may be implemented. In one embodiment, the page size may be determined based on, for example, memory and/or disk resources available.

In one embodiment, each page within dictionary storage 100 may be configured to store raw file data gathered from network traffic histories. For example, each time new file data is transferred between, for example, a content server and a client system, the file data may be stored within a new page (or pages) in dictionary storage 100. Accordingly, as new pages are added to dictionary storage 100, old pages are removed (i.e., in a circular buffer). In order to identify pages as including useable data, the data within each of the pages may be indexed with fingerprints.

In one embodiment, a fingerprint is a unique identifier which uniquely identifies a string of data within a page. Each page may include multiple fingerprints (e.g., 250 fingerprints each) which identify multiple strings within the page. In a further embodiment, fingerprints may be checksum values for small blocks of data (e.g., 4 kilobytes (KB)) within the pages. The fingerprints may then be searched to determine which pages have the best matches (or the most matches) for the data being encoded.

Figure 2:
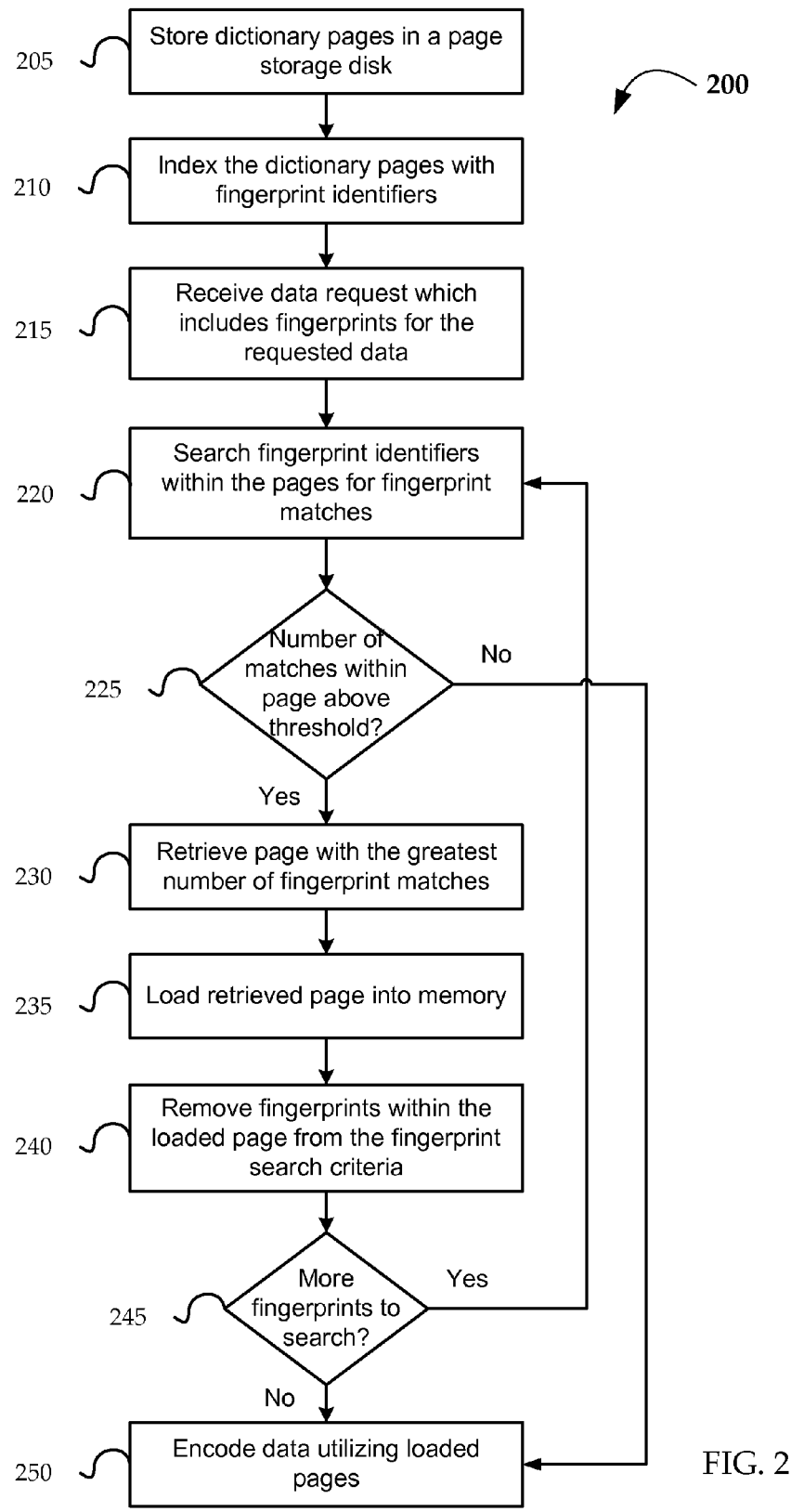
FIG. 2 is a flow diagram illustrating a method of utilizing delta coding in network acceleration, according to one embodiment of the present invention.

Turning now to FIG. 2, which illustrates a method 200 of utilizing delta coding in network acceleration. At process block 205, dictionary pages may be stored within a page storage disk (e.g., dictionary storage 100 (FIG. 1)). In one embodiment, the pages stored within the dictionary may include raw file data collected from network traffic histories. For example, the pages may include prefetched data files, cached data, browser history, etc.

Furthermore, at process block 210, the data stored within the pages of the dictionary storage may be indexed using fingerprint identifiers. In one embodiment, the indexing process is performed in response to a request made to the dictionary (i.e., the index may be generated on-the-fly). Hence, once a data request for pages within the dictionary is received (process block 215), the fingerprint index is created to facilitate access to the pages within the dictionary. In one embodiment, the data request may include fingerprints associated with the requested data.

At process block 220, the fingerprint index may be searched to determine matches with the fingerprints for the data within the dictionary pages and the requested data fingerprints. In some instances a page may be a perfect match with a requested page, in which each fingerprint within the dictionary page matches each fingerprint within the requested page. However, in many instances, a dictionary page may only be a partial match. For example, a page may include two hundred and fifty fingerprints and only one hundred of the fingerprints may match the requested page's fingerprints. Thus, because the present invention utilizes pages which do not need to be a perfect match, more efficient encoding and acceleration can occur.

Furthermore, because pages are not required to be perfect matches, much larger pages may be utilized. This is because if only exact matches may be utilized then a page must be extremely small in order to find any fingerprint matches (i.e., the more bytes a page has to match, the likelihood of getting an exact match is significantly reduced). However, since in the present invention imperfect matches are still useful, larger page sizes may be utilized. Utilizing larger pages has a variety of advantages such as, less synchronization and overhead (i.e., less network chatter). For example, when dictionary page synchronization occurs, fewer pages and page index updates need to be transferred because fewer (but larger) pages are being used.

Furthermore, larger pages increase overhead efficiency. This is because each disk search and disk read operation takes a given amount of time (e.g., five milliseconds (ms) for each search and five ms for each read). Thus, because each page is large, fewer pages exist causing fewer searches and reads to be performed on the disk, making accessing the disk more efficient than if the pages were smaller.

Even though a page may have some matching fingerprints, the number may still be too small to facilitate more efficient encoding. In one embodiment, this may be the case because of the time required for disk accesses and disk reads. Accordingly, a threshold value may be established. For example, in pages with two hundred fingerprints each, a threshold may be that a page has to match, for example, at least ten fingerprints.

Furthermore, the disk load and server congestion may also be taken into account when determining the threshold value. For example, if the disk storing the dictionary pages is not being heavily accessed and the server is not congested, then the fingerprint matching threshold may be reduced to five matching fingerprints. However, if the disk is being heavily accessed and the server is very congested, then the fingerprint match threshold may be increased to thirty matches. Thus, a dynamic fingerprint matching threshold may be generated.

Hence, at decision block 225, a determination is made whether the number of matching fingerprints within an identified page is within the threshold. If the fingerprint matches are not within the threshed, then the requested data is simply encoded using any pages already loaded into memory (process block 250). Otherwise, the page with the greatest number of fingerprint matches is retrieved from the dictionary (process block 230).

At process block 235, the retrieved page may be loaded into memory to be accessed when encoding the requested data. Once the page has been loaded into memory, the matched fingerprints found within the loaded page are removed from the fingerprint search criteria (process block 240). In other words, once a fingerprint has been found within a page and the page has been loaded, there is no longer a need to continue to search for that fingerprint within another page. Thus, as more and more fingerprints are matched within retrieved pages, fewer fingerprints remain to be searched. This searching process may continue until there are no more fingerprints to search, or no more fingerprint matches (decision block 245).

In one embodiment, this process of matching fingerprints and loading the corresponding pages in memory may be referred to as a pre-encoding check. This pre-encoding check allows for more efficient encoding by marking matched bytes within the pages as already encoded which reduces the amount of data which needs to be encoded.

One example of this matching/pre-encoding process may be implemented in the context of a modified text document. For example, a text document may be three MBs and take up three corresponding pages within the dictionary. The text document may be slightly modified the next time the text document is transferred across a network. Thus, the first two pages may be identical (i.e., not modified with perfect fingerprint matches) and the third page may be slightly different (e.g., two hundred out of two hundred and fifty fingerprint matches). Accordingly, only the data associated with the modified portion of the file (i.e. the data associated with the fifty non-matching fingerprints) needs to be encoded. Hence, the entire modified file can be recreated with the unmodified data from the dictionary and the newly retrieved modified portion of the data.

In a further embodiment, a maximum number of pages to be loaded into memory may be established. For example, if the server's memory capacity is limited, then the maximum number of pages may be set at two pages; however, if the server's memory capacity is greater, the maximum number of pages may be set to eight, ten, twelve, and so forth. The more pages that are able to be loaded into memory allow for a more expansive and inclusive active dictionary which allows for more efficient and effective encoding. Additionally, as pages within memory need to be swapped out of memory and new pages need to be swapped into memory, Lempel-Ziv Predictive (LZP) encoding allows for the pages to be quickly and efficiently swapped in and out of memory.

Figure 3:
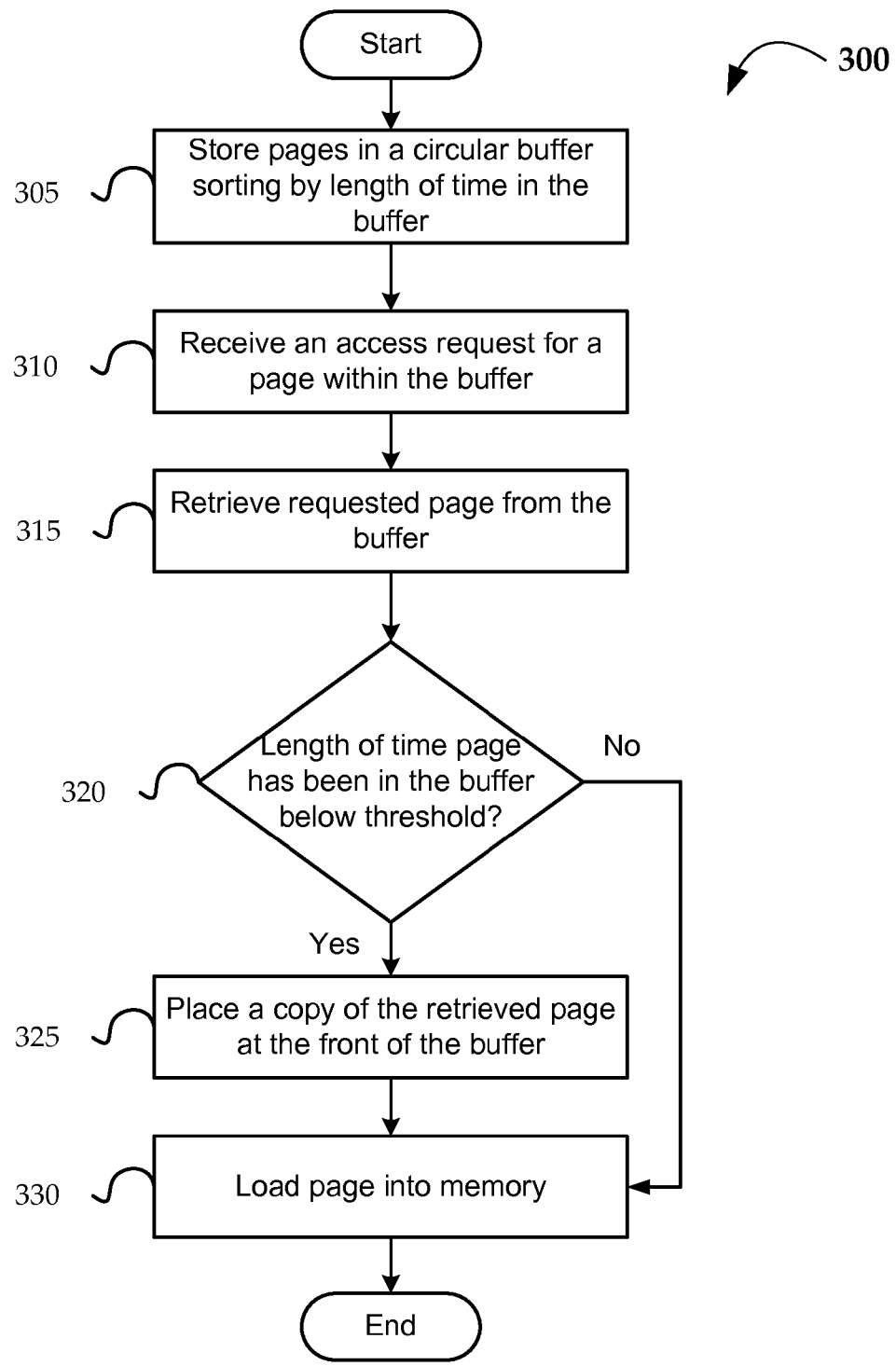
FIG. 3 is a flow diagram illustrating a method of implementing a modified circular buffer, according to one embodiment of the present invention.

Referring now to FIG. 3, which illustrates a method 300 of implementing a modified circular buffer. As mentioned above, dictionary pages may be stored within a circular buffer, in which old pages are replaced as additional new pages are added to the buffer. However, FIG. 3 illustrates a modified circular buffer which takes into consideration page accesses in determining whether to keep a page in the buffer. At process block 305, dictionary pages may be stored in the circular buffer and are then sorted by the length of time the page has been in the buffer (i.e., sorted by how old the page is).

At process block 310, an access request for a page within the buffer is received. The access request may be based on, as discussed above, the page including a sufficient number of fingerprint matches with the fingerprints of requested data. Accordingly, the requested page may be retrieved from the buffer (process block 315). As such, a determination is made whether the length of time the retrieved page has been in the buffer is below a threshold (decisions block 320). For example, if the length of time that the page has been in the buffer places the page at the last twenty-five percent of the buffer, then the page may be below the threshold. However, other threshold values may be used. In other words, the determination is made whether the page is in danger of being completely removed from the buffer based on the time the page has been in the buffer.

If the page does not fall below the threshold, then the page is not in danger of being completely removed from the buffer, and so the page may simply be loaded into memory (process block 330). However, if the page does fall below the threshold and is in fact in danger of being completely removed form the buffer, then a copy of the page is placed at the front of the buffer (process block 325), and then the page is loaded into memory (process block 330). Hence, pages which may be older within the buffer, but which have been recently accessed are able to remain in the buffer, while other old pages which are not accessed are simply removed from the buffer as time passes.

Figure 4:
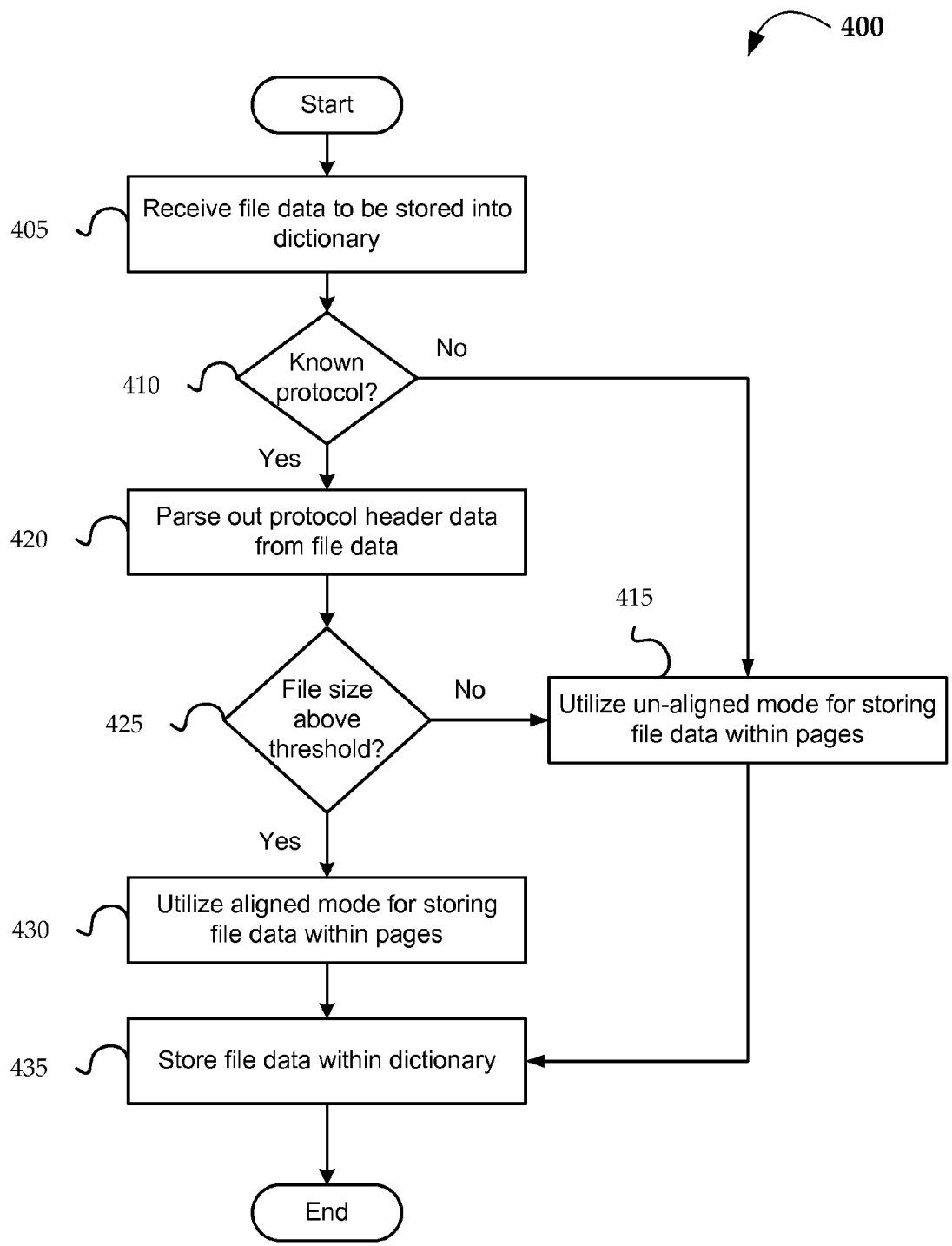
FIG. 4 is a flow diagram illustrating a method of determining whether to store data within dictionary pages using aligned or un-aligned pages at file boundaries, according to one embodiment of the present invention.

Turning now to FIG. 4, which illustrates a method 400 of determining whether to store data within dictionary pages using aligned or un-aligned pages at file boundaries. In one embodiment, when storing files within pages of a dictionary, the data may be stored in such a way that files break (or terminate) at page boundaries (i.e., aligned), or the data may be stored in such a way that the files do not break at page boundaries (i.e., un-aligned). There are advantages to both aligned and un-aligned pages, which will be discussed below.

At process block 405, file data to be stored within a dictionary is received. In one embodiment, the data may be streaming data being received over a network connection. At decision block 410, a determination is made whether, based on the data being received, a known protocol can be identified. For example, the Hyper Text Transfer Protocol (HTTP) includes distinctive protocol header information which can be used to identify the HTTP protocol. However, other protocols may be more difficult or even impossible to identify by simply analyzing the data streaming across the network connection. One example may be a raw Transmission Control Protocol (TCP) data transmission.

If the protocol cannot be determined, then un-aligned mode for storing the file data should be used. This is because protocol header information typically changes each time a file is transferred and would corrupt any fingerprint matching attempts. In other words, two instances of the exact same file being transferred across the network, when stored with the protocol header data, may appear to be two completely different files. Hence, by keeping the header data with the file, the file is, in a sense, corrupted. Nonetheless, if the protocol is not known, or cannot be identified, then there is no choice but to store the file with the protocol data included. However, the file data should nonetheless be stored using an un-aligned mode because there is no way of determining where the file begins and ends (process block 415).

Alternatively, if the protocol is known or can be determined, then the protocol header information is parsed out of the file (process block 420). Thus, only the file itself is left to be stored in the dictionary pages. Even though the protocol can be parsed out and the file identified, a determination may still be made whether the file size is above a file size threshold (decision block 425). For example, if a file is one and one half MBs and a page is one MB, then aligned mode would store the file in one full page and only one-half of a second page. This situation may be worth the "wasted" one-half page of dictionary storage space; however, if the file is only twenty KBs, the page may be below the file size threshold. In other words, the benefit gained by utilizing aligned mode may be outweighed by the wasted dictionary space as well as the overhead cost of accessing a page with such little data stored within the page.

Furthermore, the threshold may also be based, at least in part, on the CPU capacity of the server. Stated differently, if the CPU is running idle or at a low capacity, then disk accesses of pages which are mostly empty may still be beneficial. However, if the CPU of the server is running at or near capacity, the benefit gained by accessing a nearly empty page may be outweighed by the additional strain on an already strained CPU. Thus, CPU capacity and load is also be considered when determining whether the stored data in dictionary pages uses aligned or un-aligned mode. Accordingly, if the file is above the file size threshold, then the file data is stored in the pages of the dictionary (process block 435) utilizing aligned mode (process block 430). Hence, the pages within the dictionary are filled such that the file breaks on a page.

Figure 5:
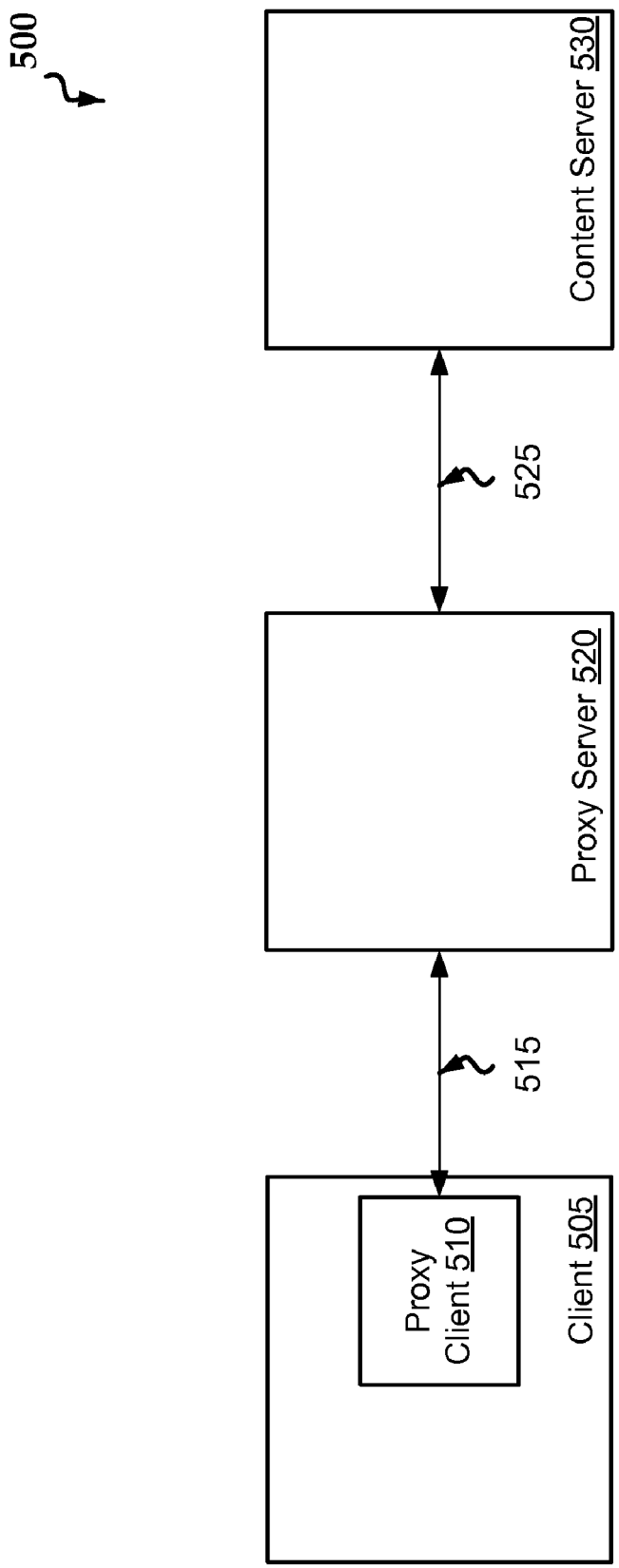
FIG. 5 is a block diagram illustrating a system for implementing network acceleration, according to one embodiment of the present invention.

Referring now to FIG. 5, which illustrates a system 500 for implementing network acceleration utilizing the techniques described above. In one embodiment, system 500 may include a client 505. Client 505 may include a proxy client 510. Client 505 may be coupled with a proxy server 520 over a high latency link 515, and proxy server 520 may be coupled with a content server 530 over a low latency link 525.

In one embodiment, proxy server 520 may utilize the techniques described in methods 200, 300, and 400 above in order to accelerate the network traffic between content server 530 and client 505. For example, content server 530 may be a web server, a data server, an FTP server, etc., and client 505 may be attempting to retrieve a file from content server 530. Accordingly, proxy server 520 intercepts communications between client 505 and content server 530 and is configured to accelerate the transmission for the requested file using the techniques outlined above in methods 200, 300, and 400.

Figure 6:
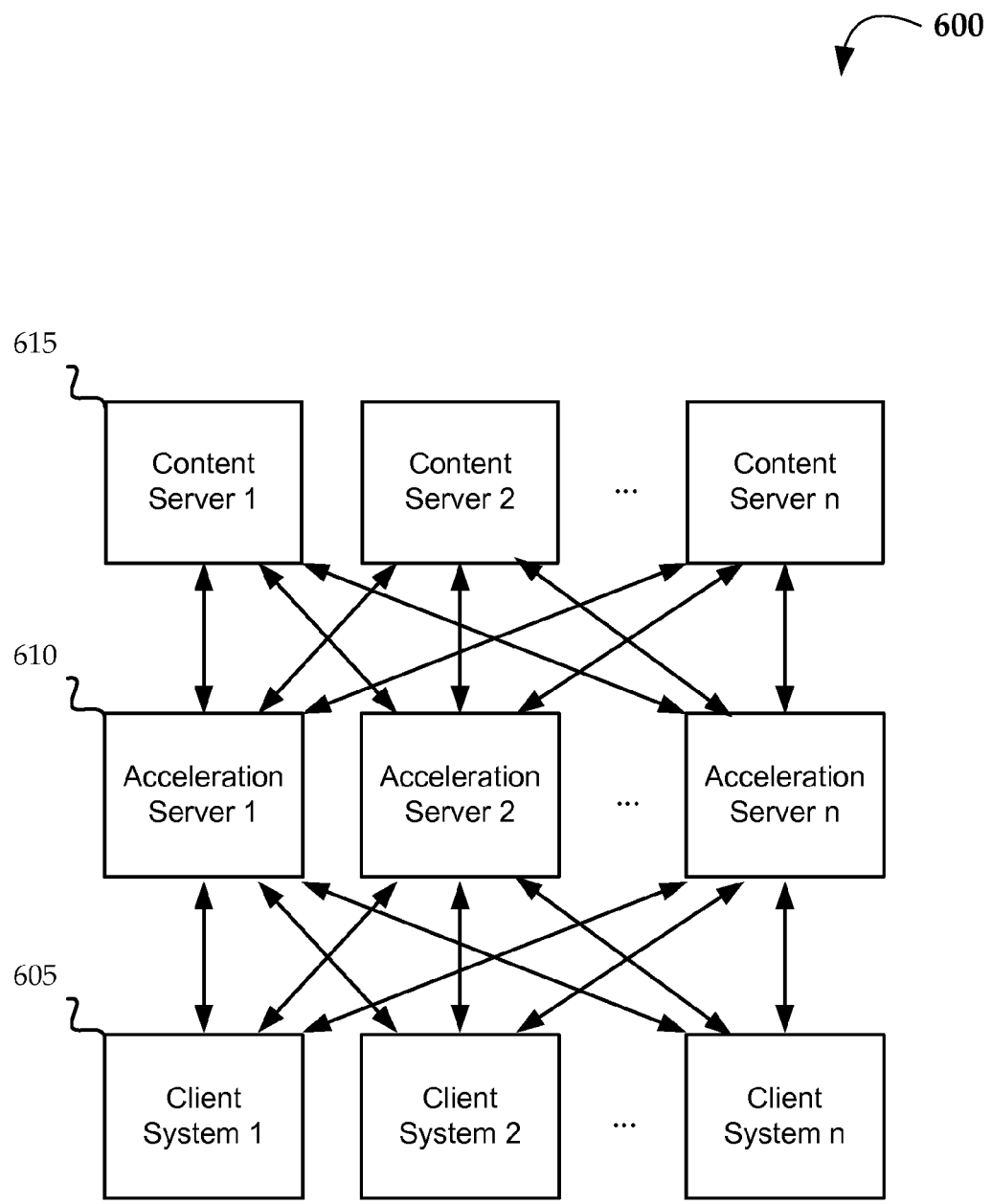
FIG. 6 is a block diagram illustrating a network configuration, according to one embodiment of the present invention.

Turning now to FIG. 6, which illustrates a network 600 for implementing various aspects of the present invention. In one embodiment, network 600 may be a mesh network configuration. In such a configuration, each client 605 may include its own delta coder, and each client 605 may be able to access multiple acceleration servers 610.

In a further embodiment, client system 1, for example, may have a more extensive history with acceleration server 1, as opposed to acceleration server 2. Accordingly, for each new session that client system 1 initiates it will be more advantageous for the session to be with acceleration server 1. Hence, each page in the dictionary may include a tag which serves to identify the acceleration server to which the page is associated. Therefore, each time client system 1 establishes a new session; its history can be analyzed to determine which acceleration server client system 1 has interacted with the most. Then, that acceleration server can subsequently be used for the session. In other words, cross-session server stickiness can be achieved, where the client system sticks to (or returns to) the server in which the client system has used most in previous sessions.

In an alternative embodiment, a shared dictionary may be implemented. For example, if acceleration server 1 is located in California and acceleration server 2 is located in New York and client system 2 accesses both servers are various times, a shared history is maintained. The shared history would include dictionary page entries associated with both acceleration server 1 and acceleration server 2. The entries would include identifiers for each of the servers. Thus, when client system 2 connects to, for example, acceleration server 1 in California, then client system 2 would search its history for all the entries which are tagged as acceleration server 1 entries, and then indicate to acceleration server 1 which pages it has stored.

Furthermore, if client system 2 accesses acceleration server 1 more often than acceleration server 2, then client system 1 would naturally maintain more pages associated with acceleration server 1 because more new pages and refreshed pages tagged as acceleration server 1 pages would be in client system 2's history than pages associated with the less frequented acceleration server 2.

In a further embodiment, acceleration servers 610 may be configured as a server farm in a data center. In this configuration, a global history may be maintained in a global storage array. Accordingly, instead of each server 610 maintaining its own individual page dictionary, a single global dictionary would be maintained and shared by all the servers within the farm. This provides multiple advantages over individually maintained dictionary pages. For example, the storage of pages is separated from the indexing and searching of the pages. This allows storage to be done exclusively by a storage array network which simply includes an array of disks to store the pages, whereas the processing can then be performed by acceleration servers 610. Furthermore, this configuration works particularly well with the large sized pages (described above) because communication is less chatty. Accordingly, system 600 may be configured to effectively implement methods 200, 300, and 400 as described above.

A number of variations and modifications of the disclosed embodiments can also be used. For example, content server 530 (FIG. 5) may be a variety of server types, including but not limited to a file server, a mail server, a content server, a web server, etc. It should be appreciated that file formats and compression algorithms not specifically mentioned may be used.

Figure 7:
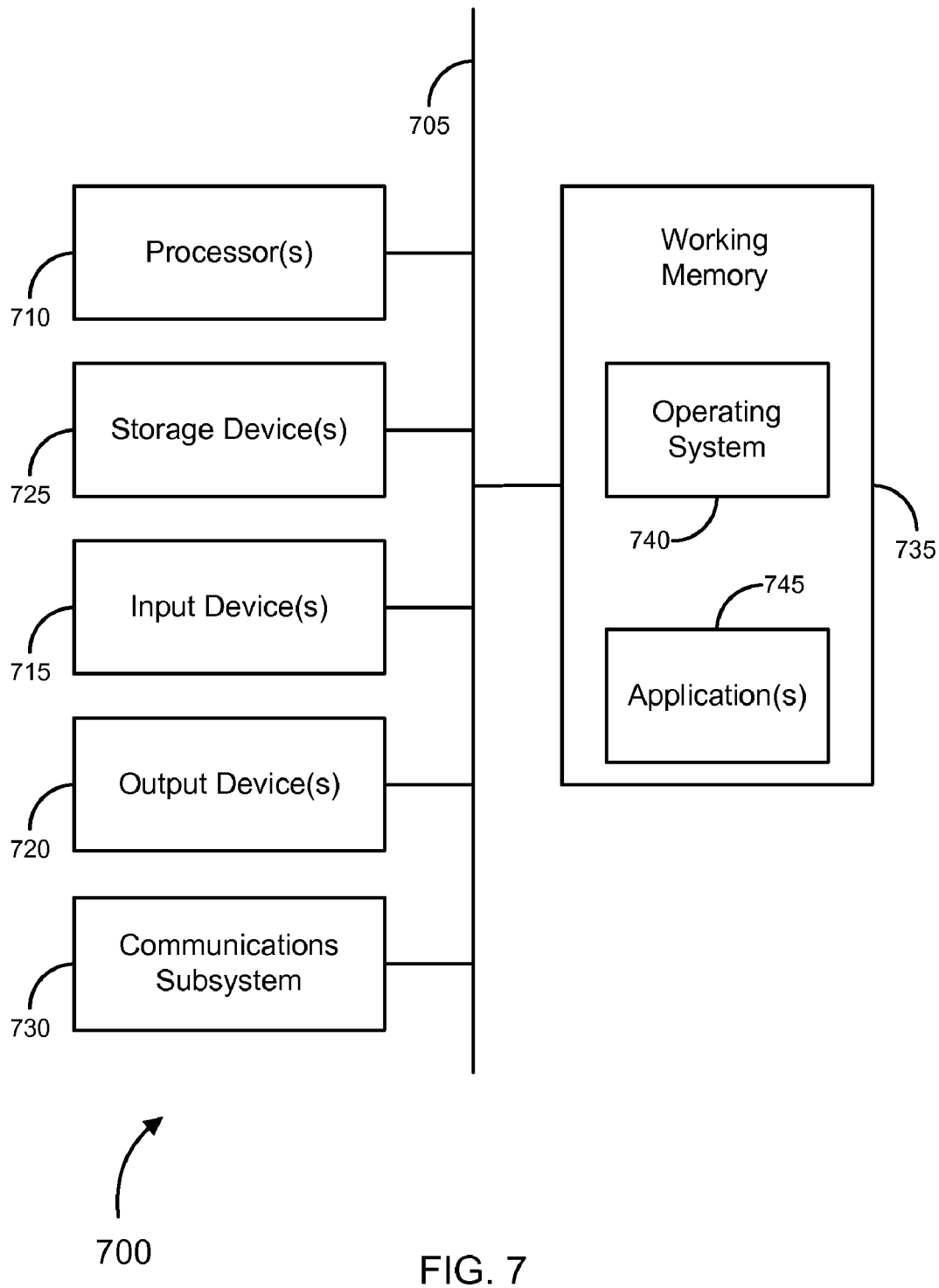
FIG. 7 is a generalized schematic diagram illustrating a computer system, in accordance with various embodiments of the invention.

FIG. 7 provides a schematic illustration of one embodiment of a computer system 700 that can perform the methods of the invention, as described herein, and/or can function, for example, as any part of client 505, content server 530, etc. of FIG. 5. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including without limitation one or more general-purpose processors and/or one or more special-purpose processors (such as digital signal processing chips, graphics acceleration chips, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740 and/or other code, such as one or more application programs 745, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 725. Volatile media includes, without limitation dynamic memory, such as the working memory 735. Transmission media includes coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation, radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
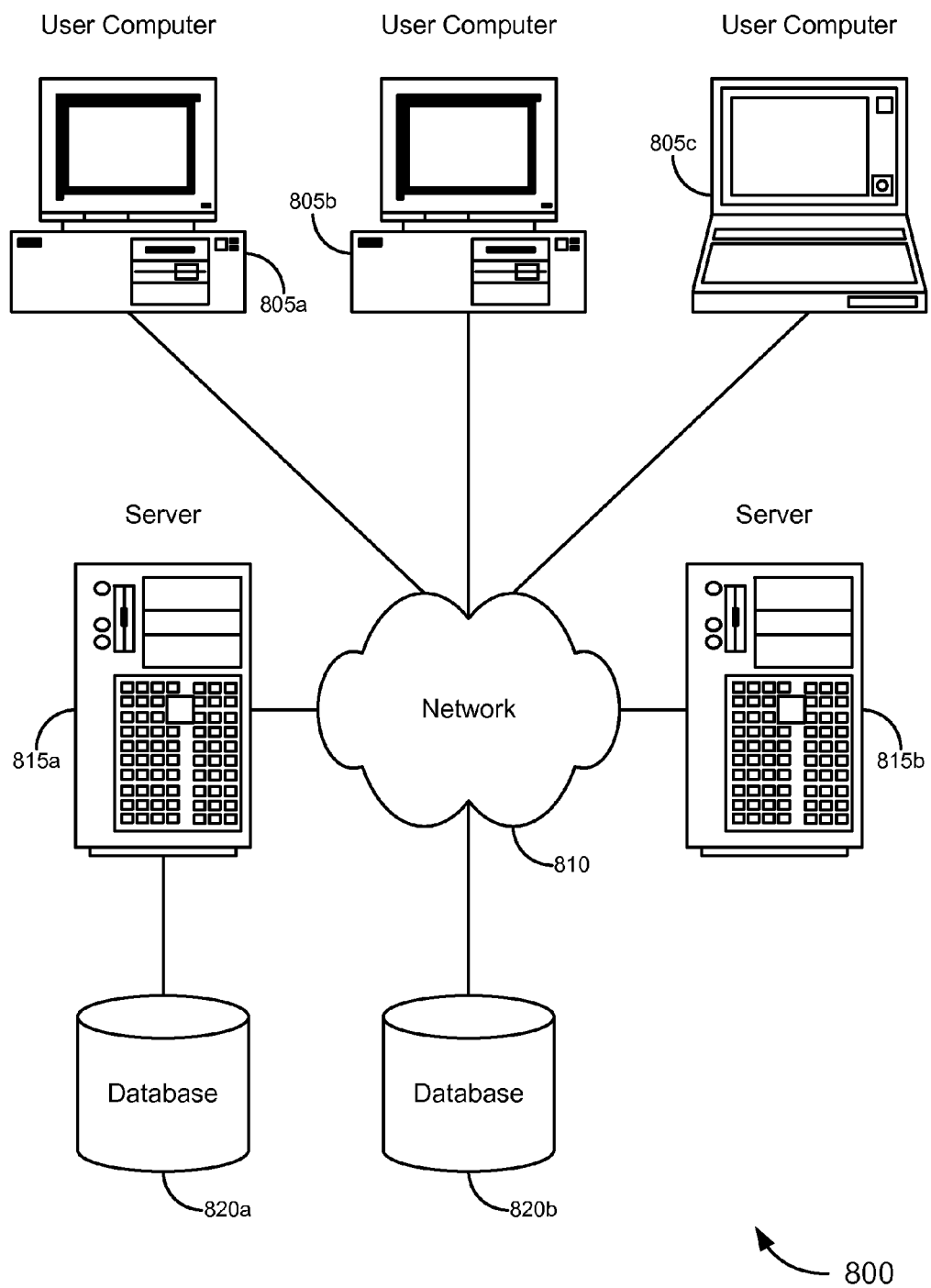
FIG. 8 is a block diagram illustrating a networked system of computers, which can be used in accordance with various embodiments of the invention.

A set of embodiments comprises systems for dynamic routing. In one embodiment, proxy server 520, content server 530, etc. of FIG. 5, may be implemented as computer system 700 in FIG. 7. Merely by way of example, FIG. 8 illustrates a schematic diagram of a system 800 that can be used in accordance with one set of embodiments. The system 800 can include one or more user computers 805. The user computers 805 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 805 can also have any of a variety of applications, including one or more applications configured to perform methods of the invention, as well as one or more office applications, database client and/or server applications, and web browser applications. Alternatively, the user computers 805 can be any other electronic device, such as a thin-client computer, Internet-enabled mobile telephone, and/or personal digital assistant (PDA), capable of communicating via a network (e.g., the network 810 described below) and/or displaying and navigating web pages or other types of electronic documents. Although the exemplary system 800 is shown with three user computers 805, any number of user computers can be supported.

Certain embodiments of the invention operate in a networked environment, which can include a network 810. The network 810 can be any type of network familiar to those skilled in the art that can support data communications using any of a variety of commercially available protocols, including without limitation TCP/IP, SNA, IPX, AppleTalk, and the like. Merely by way of example, the network 810 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 805 to perform methods of the invention.

The server computers 815, in some embodiments, might include one or more application servers, which can include one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 805 and/or another server 815. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement methods of the invention incorporated by an application running on a user computer 805 and/or another server 815. Alternatively, as those skilled in the art will appreciate, a file server can include all necessary files, allowing such an application to be invoked remotely by a user computer 805 and/or server 815. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as the database can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, that is adapted to store, update, and retrieve data in response to SQL-formatted commands. The database might be controlled and/or maintained by a database server, as described above, for example.

Figure 9:
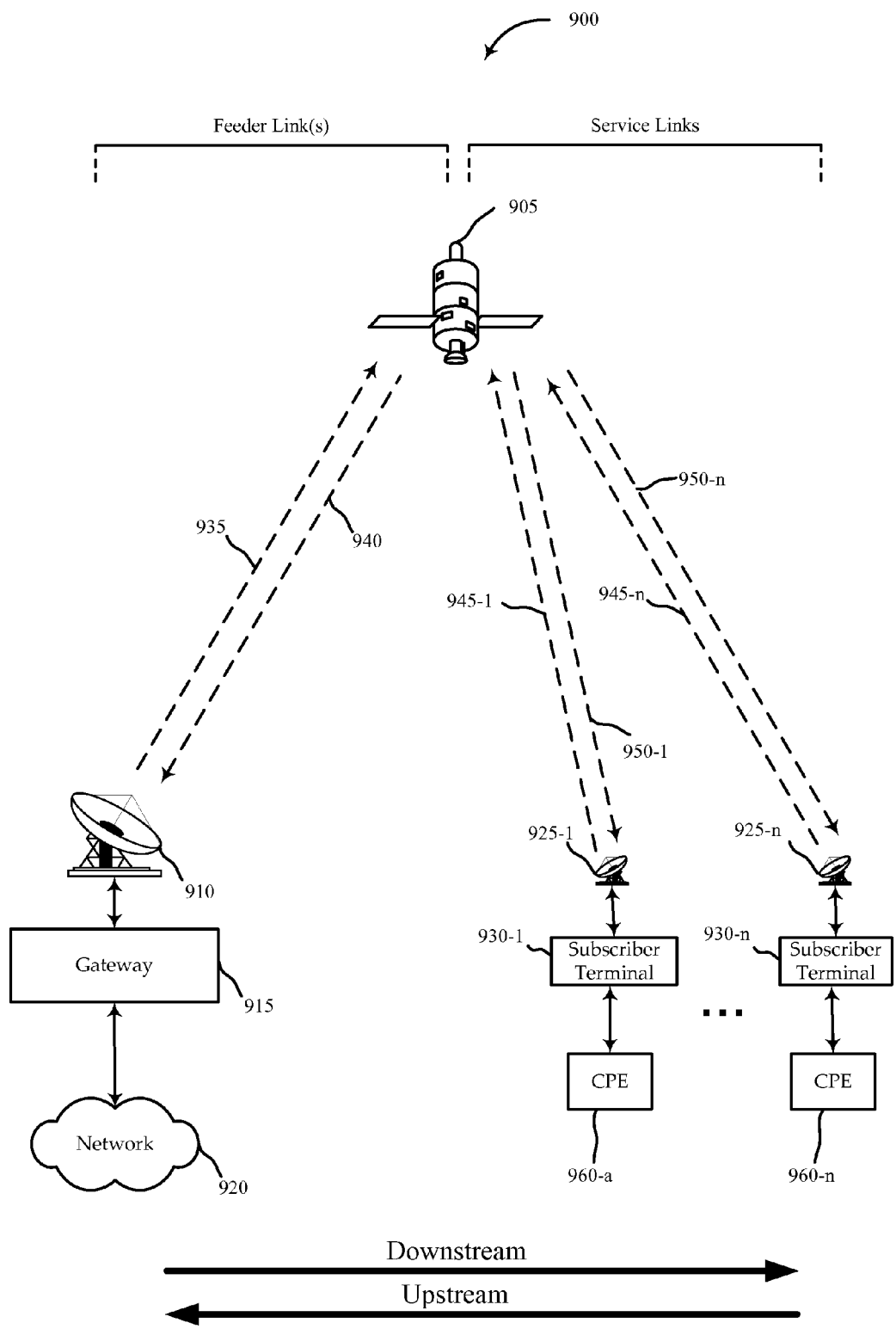
FIG. 9 is a block diagram illustrating a satellite communications system, which can be used in accordance with various embodiments of the invention.

Referring first to FIG. 9, a module diagram is shown of a satellite communications system 900 for use with various embodiments of the invention. The satellite communications system 900 includes a network 920, such as the Internet, interfaced with a gateway 915 that is configured to communicate with one or more subscriber terminals 930, via a satellite 905. A gateway 915 is sometimes referred to as a hub or ground station. Subscriber terminals 930 are sometimes called modems, satellite modems, or user terminals. As noted above, although the communications system 900 is illustrated as a geostationary satellite 905 based communication system, it should be noted that various embodiments described herein are not limited to use in geostationary satellite-based systems; for example, some embodiments could be low earth orbit ("LEO") satellite-based systems or aerial payloads not in orbit and held aloft by planes, blimps, weather balloons, etc. Other embodiments could have a number of satellites instead of just one.

The network 920 may be any type of network and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network supporting data communication between devices described herein, in different embodiments.

A network 920 may include both wired and wireless connections, including optical links As illustrated in a number of embodiments, the network 920 may connect the gateway 915 with other gateways (not shown), which are also in communication with the satellite 905.

The gateway 915 provides an interface between the network 920 and the satellite 905. The gateway 915 may be configured to receive data and information directed to one or more subscriber terminals 930, and can format the data and information for delivery to the respective destination device via the satellite 905. Similarly, the gateway 915 may be configured to receive signals from the satellite 905 (e.g., from one or more subscriber terminals 930) directed to a destination in the network 920, and can process the received signals for transmission along the network 920.

A device (not shown) connected to the network 920 may communicate with one or more subscriber terminals 930. Data and information, for example IP datagrams, may be sent from a device in the network 920 to the gateway 915. It will be appreciated that the network 920 may be in further communication with a number of different types of providers, including content providers, application providers, service providers, etc. Further, in various embodiments, the providers may communicate content with the satellite communication system 900 through the network 920, or through other components of the system (e.g., directly through the gateway 915).

The gateway 915 may format frames in accordance with a physical layer definition for transmission to the satellite 905. A variety of physical layer transmission modulation and coding techniques may be used with certain embodiments of the invention, including those defined with the DVB-S2 standard. The link 935 from the gateway 915 to the satellite 905 may be referred to hereinafter as the downstream uplink 935. The gateway 915 uses the antenna 910 to transmit the content (e.g., via signals) to the satellite 905. In one embodiment, the antenna 910 comprises a parabolic reflector with high directivity in the direction of the satellite and low directivity in other directions. The antenna 910 may comprise a variety of alternative configurations and include operating features such as high isolation between orthogonal polarizations, high efficiency in the operational frequency bands, and low noise.

In one embodiment, a geostationary satellite 905 is configured to receive the signals from the location of antenna 910 and within the frequency band and specific polarization transmitted. The satellite 905 may, for example, use a reflector antenna, lens antenna, array antenna, active antenna, or other mechanism known in the art for reception of such signals. The satellite 905 may process the signals received from the gateway 915 and forward the signal from the gateway 915 containing the MAC frame to one or more subscriber terminals 930. In one embodiment, the satellite 905 operates in a multi-beam mode, transmitting a number of narrow beams, each directed at a different region of the earth, allowing for frequency re-use with a multicolor beam pattern.

With such a multibeam satellite 905, there may be any number of different signal switching configurations on the satellite 905, allowing signals from a single gateway 915 to be switched between different spot beams. In one embodiment, the satellite 905 may be configured as a "bent pipe" satellite, wherein the satellite may frequency-convert the received carrier signals before retransmitting these signals to their destination, but otherwise perform little or no other processing on the contents of the signals. There could be a single carrier signal for each service spot beam or multiple carriers in different embodiments. Similarly, single or multiple carrier signals could be used for the feeder spot beams. A variety of physical layer transmission modulation and coding techniques may be used by the satellite 905 in accordance with certain embodiments of the invention, including those defined with the DVB-S2 standard. For other embodiments, a number of configurations are possible (e.g., using LEO satellites, or using a mesh network instead of a star network), as will be evident to those skilled in the art.

The service signals transmitted from the satellite 905 may be received by one or more subscriber terminals 930, via the respective subscriber antenna 925. In one embodiment, the subscriber antenna 925 and terminal 930 together comprise a very small aperture terminal ("VSAT"), with the antenna 925 measuring approximately 0.6 meters in diameter and having approximately 2 watts of power. In other embodiments, a variety of other types of subscriber antennae 925 may be used at the subscriber terminal 930 to receive the signal from the satellite 905. The link 950 from the satellite 905 to the subscriber terminals 930 may be referred to hereinafter as the downstream downlink 950. Each of the subscriber terminals 930 may comprise a single user terminal or, alternatively, comprise a hub or router (not pictured) that is coupled to multiple user terminals.

In some embodiments, some or all of the subscriber terminals 930 are connected to consumer premises equipment ("CPE") 960. CPE may include, for example, computers, local area networks, Internet appliances, wireless networks, etc. A subscriber terminal 930, for example 930-a, may transmit data and information to a network 920 destination via the satellite 905. The subscriber terminal 930 transmits the signals via the upstream uplink 945-a to the satellite 905 using the subscriber antenna 925-a. The link from the satellite 905 to the gateway 915 may be referred to hereinafter as the upstream downlink 940.

In various embodiments, one or more of the satellite links (e.g., 935, 940, 945, and/or 950) are capable of communicating using one or more communication schemes. In various embodiments, the communication schemes may be the same or different for different links. The communication schemes may include different types of coding and modulation schemes. For example, various satellite links may communicate using physical layer transmission modulation and coding techniques, adaptive coding and modulation schemes, etc. The communication schemes may also use one or more different types of multiplexing schemes, including Multi-Frequency Time-Division Multiple Access ("MF-TDMA"), Time Division Multiple Access ("TDMA"), Frequency Division Multiple Access ("FDMA"), Orthogonal Frequency Division Multiple Access ("OFDMA"), Code Division Multiple Access ("CDMA"), or any number of hybrid or other schemes known in the art.

In a given satellite spot beam, all customers serviced by the spot beam may be capable of receiving all the content traversing the spot beam by virtue of the fact that the satellite communications system 900 employs wireless communications via various antennae (e.g., 910 and 925). However, some of the content may not be intended for receipt by certain customers. As such, the satellite communications system 900 may use various techniques to "direct" content to a subscriber or group of subscribers. For example, the content may be tagged (e.g., using packet header information according to a transmission protocol) with a certain destination identifier (e.g., an IP address) or use different modcode points. Each subscriber terminal 930 may then be adapted to handle the received data according to the tags. For example, content destined for a particular subscriber terminal 930 may be passed on to its respective CPE 960, while content not destined for the subscriber terminal 930 may be ignored. In some cases, the subscriber terminal 930 caches information not destined for the associated CPE 960 for use if the information is later found to be useful in avoiding traffic over the satellite link.

Figure 10:
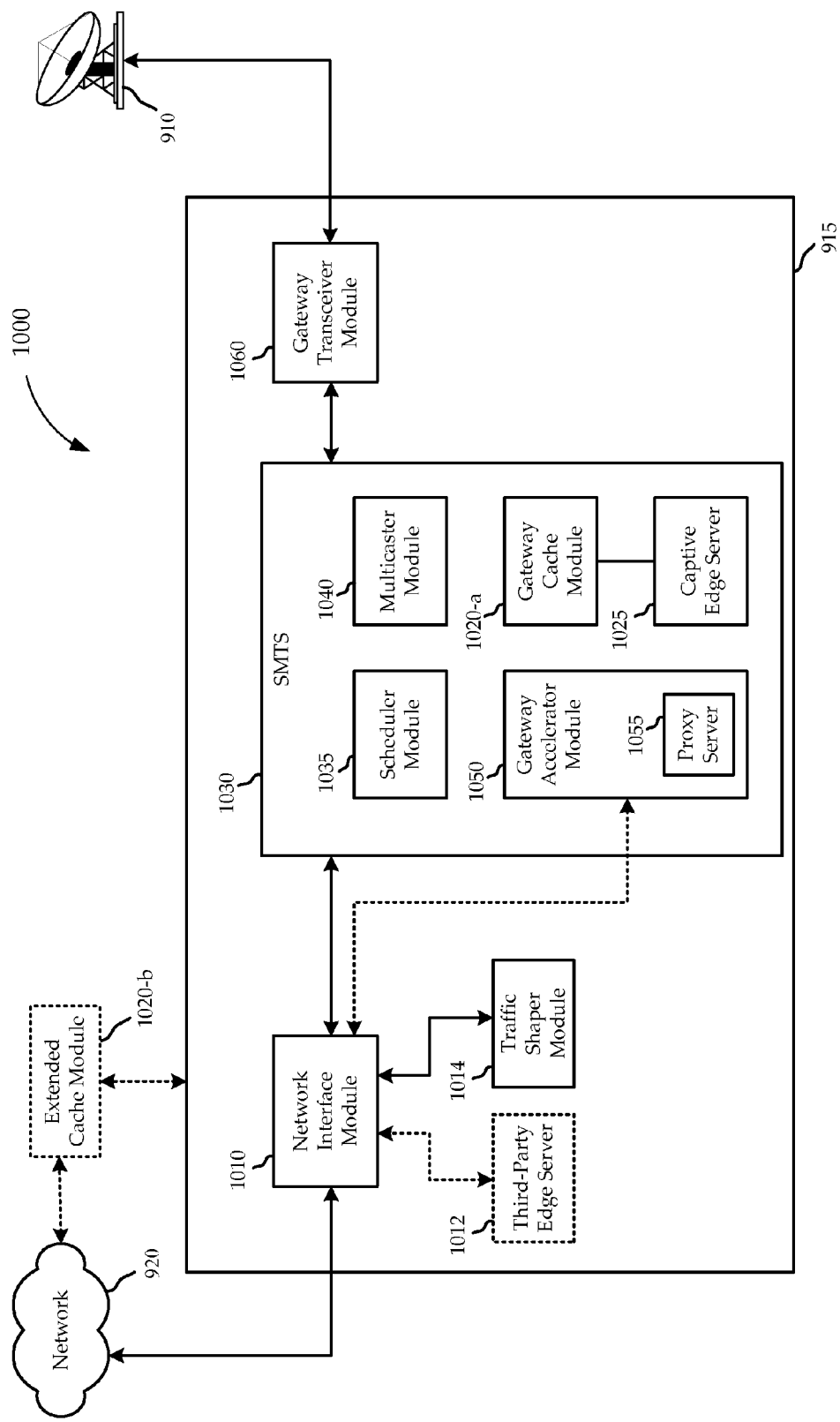
FIG. 10 is a block diagram illustrating a satellite gateway, which can be used in accordance with various embodiments of the invention.

It will be appreciated that many embodiments of gateways are possible for use in embodiments of communication systems, like the satellite communication system 900 of FIG. 9. FIG. 10 shows a simplified block diagram 1000 illustrating an embodiment of a gateway 915 coupled between the network 920 and an antenna 910, according to various embodiments of the invention. The gateway 915 has a number of components, including a network interface module 1010, a satellite modem termination system ("SMTS") 1030, and a gateway transceiver module 1060.

Components of the gateway 915 may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific controllers.

Embodiments of the gateway 915 receive data from the network 920 (e.g., the network 920 of FIG. 9), including data destined for one or more subscribers in a spot beam. The data is received at the network interface module 1010, which includes one or more components for interfacing with the network 920. For example, the network interface module 1010 includes a network switch and a router.

In some embodiments, the network interface module 1010 interfaces with other modules, including a third-party edge server 1012 and/or a traffic shaper module 1014. The third-party edge server 1012 may be adapted to mirror content (e.g., implementing transparent mirroring, like would be performed in a point of presence ("POP") of a content delivery network ("CDN")) to the gateway 915. For example, the third-party edge server 1012 may facilitate contractual relationships between content providers and service providers to move content closer to subscribers in the satellite communication network 900. The traffic shaper module 1014 controls traffic from the network 920 through the gateway 915, for example, to help optimize performance of the satellite communication system 900 (e.g., by reducing latency, increasing effective bandwidth, etc.). In one embodiment, the traffic shaper module 1014 delays packets in a traffic stream to conform to a predetermined traffic profile.

Traffic is passed from the network interface module 1010 to the SMTS 1030 to be handled by one or more of its component modules. In some embodiments, the SMTS 1030 includes a scheduler module 1035, a multicaster module 1040, a gateway accelerator module 1050, a gateway cache module 1020-a, and/or a captive edge server 1025. Embodiments of the scheduler module 1035 are configured to provide various functions relating to scheduling the links of the satellite communication system 900 handled by the gateway 915. For example, the scheduler module 1035 may manage link bandwidth by scheduling license grants within a spot beam. Embodiments of the multicaster module 1040 are configured to provide various functions relating to multicasting of data over the links of the satellite communication system 900. For example, the multicaster module 1040 may determine whether data is unicast or multicast to one or more subscribers. In some embodiments, the multicaster module 1040 and/or scheduler module 1035 contribute to determinations of what modcodes to use, whether data should or should not be sent as a function of data cached at destination subscriber terminals 930, how to handle certain types of encryption, etc.

Embodiments of the gateway accelerator module 1050 provide various types of application, WAN/LAN, and/or other acceleration functionality. In one embodiment, the gateway accelerator module 1050 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the subscriber terminal 930 and/or CPE 960.

In some embodiments, the gateway accelerator module 1050 is adapted to provide high payload compression. For example, the gateway accelerator module 1050 may compress payload such that over 75% of upload traffic when browsing the web is being used by transport management, rather than payload data. In other embodiments, functionality of the gateway accelerator module 1050 is closely integrated with the satellite link through components of the SMTS 1030 to reduce upload bandwidth requirements and/or to more efficiently schedule to satellite link (e.g., by communicating with the scheduler module 1035). For example, the link layer may be used to determine whether packets are successfully delivered, and those packets can be tied more closely with the content they supported through application layer information. In certain embodiments, these and/or other functions of the gateway accelerator module 1050 are provided by a proxy server 1055 resident on (e.g., or in communication with) the gateway accelerator module 1050.

In some embodiments, functionality of the SMTS 1030 is provided through the gateway cache module 1020. Embodiments of the gateway cache module 1020 include any useful type of memory store for various types of functionality of the gateway 915. For example, the gateway cache module 1020 may include volatile or non-volatile storage, servers, files, queues, etc. Further, in certain embodiments, storage functionality and/or capacity is shared between an integrated (e.g., on-board) gateway cache module 1020-a and an extended (e.g., off-board) cache module 1020-b. For example, the extended cache module 1020-b may be accessible by the gateway 915 via the network 920.

In certain embodiments, the gateway cache module 1020 is in communication with the captive edge server 1025. In some embodiments, the captive edge server 1025 provides functionality similar to that of the third-party edge server 1012, including content mirroring. For example, the captive edge server 1025 may facilitate different contractual relationships from those of the third-party edge server 1012 (e.g., between the gateway 915 provider and various content providers).

It will be appreciated that the SMTS 1030 may provide many different types of functionality. For example, embodiments of the SMTS 1030 oversee a variety of decoding, interleaving, decryption, and unscrambling techniques. The SMTS 1030 may also manage functions applicable to the communication of content downstream through the satellite 905 to one or more subscriber terminals 930. In certain embodiments, some or all of these downstream communication functions are handled by the gateway transceiver module 1060.

Embodiments of the gateway transceiver module 1060 encode and/or modulate data, using one or more error correction techniques, adaptive encoding techniques, baseband encapsulation, frame creation, etc. (e.g., using various modcodes, lookup tables, etc.). Other functions may also be performed by these components (e.g., by the SMTS 1030), including upconverting, amplifying, filtering, tuning, tracking, etc. The gateway transceiver module 1060 communicates data to one or more antennae 910 for transmission via the satellite 905 to the subscriber terminals 930.

Figure 11:
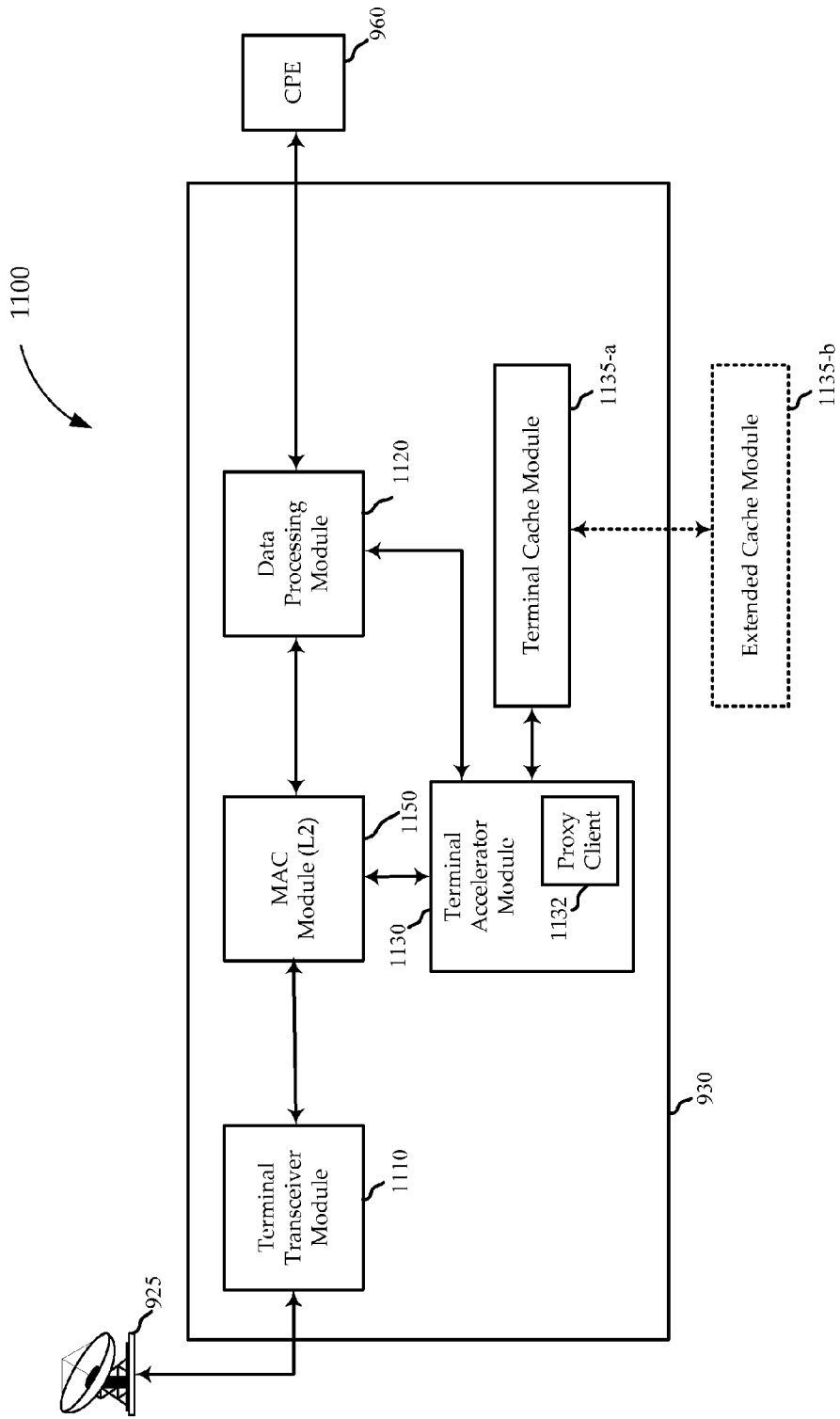
FIG. 11 is a block diagram illustrating multiple satellite subscriber terminals, which can be used in accordance with various embodiments of the invention.

FIG. 11 shows a simplified block diagram 1100 illustrating an embodiment of a subscriber terminal 930 coupled between the respective subscriber antenna 925 and the CPE 960, according to various embodiments of the invention. The subscriber terminal 930 includes a terminal transceiver module 1110, a data processing module 1120, a terminal accelerator module 1130, a terminal cache module 1135, and a MAC module 1150. The components may be implemented, in whole or in part, in hardware. Thus, they may comprise one, or more, Application Specific Integrated Circuits ("ASICs") adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, Field Programmable Gate Arrays ("FPGAs") and other Semi-Custom ICs), which may be programmed in any manner known in the art. Each may also be implemented, in whole or in part, with instructions embodied in a computer-readable medium, formatted to be executed by one or more general or application specific processors.

A signal from the subscriber antenna 925 is received by the subscriber terminal 930 at the terminal transceiver module 1110. Embodiments of the terminal transceiver module 1110 may amplify the signal, acquire the carrier, and/or downconvert the signal. In some embodiments, this functionality is performed by other components (either inside or outside the subscriber terminal 930). The downconverted signal is communicated to the data processing module 1120 to be digitized and further processed.

Embodiments of the data processing module 1120 provide various types of data processing functionality. For example, the data processing module 1120 processes the received signal by interpreting (e.g., and decoding) modulation and/or coding schemes, interpreting multiplexed data streams, filtering the digitized signal, parsing the digitized signal into various types of information (e.g., by extracting the physical layer header), etc.

In some embodiments, the data processing module 1120 is in communication with the terminal accelerator module 1130. In some embodiments, the terminal accelerator module 1130 provides substantially the same functionality as the gateway accelerator module 1050, including various types of applications, WAN/LAN, and/or other acceleration functionality. In one embodiment, the terminal accelerator module 1130 implements functionality of AcceleNet applications, like interpreting data communicated by the gateway 915 using high payload compression, handling various prefetching functions, parsing scripts to interpret requests, etc. In certain embodiments, these and/or other functions of the terminal accelerator module 1130 are provided by a proxy client 1132 resident on (e.g., or in communication with) the terminal accelerator module 1130.

In some embodiments, output from the data processing module 1120 and/or the terminal accelerator module 1130 is stored in the terminal cache module 1135. Further, the data processing module 1120 and/or the terminal accelerator module 1130 may be configured to determine what data should be stored in the terminal cache module 1135 and which data should not (e.g., which data should be passed to the CPE 960).

It will be appreciated that the terminal cache module 1135 may include any useful type of memory store for various types of functionality of the subscriber terminal 930. For example, the terminal cache module 1135 may include volatile or non-volatile storage, servers, files, queues, etc.

In certain embodiments, storage functionality and/or capacity is shared between an integrated (e.g., on-board) terminal cache module 1135-*a* and an extended (e.g., off-board) cache module 1135-*b*. For example, the extended cache module 1135-*b* may be implemented in various ways, including as an attached peripheral device (e.g., a thumb drive, USB hard drive, etc.), a wireless peripheral device (e.g., a wireless hard drive), a networked peripheral device (e.g., a networked server), etc. In one embodiment, functionality of the terminal cache module 1135 is implemented as storage integrated in the CPE 960 of FIG. 9.

Data destined for the CPE 960 (e.g., data not stored in the terminal cache module 1135 or data retrieved from the terminal cache module 1135) is communicated to the MAC module 1150. Embodiments of the MAC module 1150 prepare data for communication to the CPE 960. For example, the MAC module 1150 may modulate, encode, filter, decrypt, and/or otherwise process the data to be compatible with the CPE 960.

In certain embodiments, the subscriber terminal 930 is configured to transmit data back to the gateway 915. Embodiments of the terminal transceiver module 1110, the data processing module 1120, the terminal accelerator module 1130, the terminal cache module 1135, and/or the MAC module 1150 are configured to provide functionality for communicating information back through the satellite communication system 900 (e.g., for directing provision of services). For example, information about what is stored in the terminal cache module 1135 may be sent back to the gateway 915 for limiting repetitious file transfers, as described more fully below.

It will be appreciated that the satellite communications system 900 may be used to provide different types of communication services to subscribers. For example, the satellite communications system 900 may provide content from the network 920 to a subscriber's CPE 960, including Internet content, broadcast television and radio content, on-demand content, voice-over-Internet-protocol ("VoIP") content, and/or any other type of desired content. It will be further appreciated that this content may be communicated to subscribers in different ways, including through unicast, multicast, broadcast, and/or other communications.

Embodiments of the invention include methods, systems, and devices that use multicasting, caching, and/or other techniques to provide novel satellite communication functionality. It will be appreciated that other components and systems may be used to provide functionality of the various embodiments described herein. As such, descriptions of various embodiments in the context of components and functionality of FIGS. 9-11 are intended only for clarity, and should not be construed as limiting the scope of the invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/ or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of utilizing delta coding in acceleration proxy servers, the method comprising the following computer implemented steps:
   storing, at a proxy server, a plurality of dictionary pages within a page storage disk;
   indexing, at the proxy server, the plurality of dictionary pages with fingerprint identifiers, wherein the fingerprint identifiers are configured to uniquely identify data strings within each of the plurality of dictionary pages;
   receiving, at the proxy server, a data request, wherein the request includes a plurality of fingerprints associated with the requested data;
   searching, at the proxy server, the indexed fingerprint identifiers for matches with the plurality of fingerprints associated with the requested data;
   identifying, at the proxy server, one of the plurality of pages with the greatest number of matching fingerprints from the plurality of fingerprints associated with the requested data;
   removing, at the proxy server, the fingerprints associated with the one of the plurality of pages from the searching of the indexed fingerprints;
   searching, at the proxy server, the indexed fingerprint identifiers for matches with the remaining plurality of fingerprints associated with the requested data; and
   loading, at a client through a proxy client, the identified pages into memory; and
   encoding the requested data using the loaded pages.

2. A method of utilizing delta coding in acceleration proxy servers as in claim 1, further comprising determining that the number of matching fingerprints within the one of the plurality of pages with the greatest number of matching fingerprints from the plurality of fingerprints associated with the requested data is below a minimum threshold value.

3. A method of utilizing delta coding in acceleration proxy servers as in claim 2, further comprising, in response to the number of matching fingerprints being below the threshold value, encoding the data using a previously loaded page.

4. A method of utilizing delta coding in acceleration proxy servers as in claim 1, wherein the storing of the plurality of dictionary pages are stored in a circular buffer.

5. A method of utilizing delta coding in acceleration proxy servers as in claim 4, further comprising sorting the pages stored in the circular buffer by the length of time in which the pages have been stored in the buffer.

6. A method of utilizing delta coding in acceleration proxy servers as in claim 5, further comprising:
   receiving an access request for a dictionary page stored in the buffer; and
   retrieving the dictionary page from the buffer; and
   determining that the retrieved page has been stored in the buffer below a threshold.

7. A method of utilizing delta coding in acceleration proxy servers as in claim 6, further comprising:
   in response to the retrieved page being stored in the buffer below the threshold, placing a copy of the page in the front of the buffer; and
   loading the page into memory to responds to the access request.

8. A system for utilizing delta coding in acceleration proxy servers, the system comprising:
   a proxy server having a first processor and a storage medium which has sets of instructions stored thereon, which when executed by the processor, cause the first processor to execute the following computer implemented steps:
      store a plurality of dictionary pages within a page storage disk, index the plurality of dictionary pages with fingerprint identifiers, wherein the fingerprint identifiers are configured to uniquely identify data strings within each of the plurality of dictionary pages,
      receive a data request, wherein the request includes a plurality of fingerprints associated with the requested data,
      search the indexed fingerprint identifiers for matches with the plurality of fingerprints associated with the requested data, identify one of the plurality of pages with the greatest number of matching fingerprints from the plurality of fingerprints associated with the requested data,
      remove the fingerprints associated with the one of the plurality of pages from the searching of the indexed fingerprints, and
      search the indexed fingerprint identifiers for matches with the remaining plurality of fingerprints associated with the requested data; and
   a client including a proxy client in communication with the proxy server, the proxy client having a second processor and a storage medium which has sets of instructions stored thereon, which when executed by the second processor, cause the client to execute the following computer implemented steps:
      load the identified pages into memory, and
      render the loaded page.

9. A system for utilizing delta coding in acceleration proxy servers as in claim 8, wherein the proxy server is in communication with the client via a satellite link.

10. A system for utilizing delta coding in acceleration proxy servers as in claim 8, further comprising a content server.

11. A system for utilizing delta coding in acceleration proxy servers as in claim 10, wherein the content server is configured to provide the data to the proxy server in response to the data request.

12. A system for utilizing delta coding in acceleration proxy servers as in claim 11, wherein the content server is one or more of the following: a file server, a mail server, a web server, and a FTP server.

13. A system for utilizing delta coding in acceleration proxy servers as in claim 12, further comprising a plurality of content servers in communication with the proxy server, wherein the content server is one of the plurality of content servers.

14. A system for utilizing delta coding in acceleration proxy servers as in claim 8, wherein the proxy server is an acceleration server.

15. A system for utilizing delta coding in acceleration proxy servers as in claim 8, further comprising a plurality of clients in communication with the proxy server, wherein the client is one of the plurality of clients.

16. A non-transitory machine-readable medium having sets of instructions stored thereon which, when executed by a machine, cause the machine to:
  store a plurality of dictionary pages within a page storage disk;
  index the plurality of dictionary pages with fingerprint identifiers, wherein the fingerprint identifiers are configured to uniquely identify data strings within each of the plurality of dictionary pages;
  receive a data request, wherein the request includes a plurality of fingerprints associated with the requested data;
  search the indexed fingerprint identifiers for matches with the plurality of fingerprints associated with the requested data;
  identify one of the plurality of pages with the greatest number of matching fingerprints from the plurality of fingerprints associated with the requested data;
  remove the fingerprints associated with the one of the plurality of pages from the searching of the indexed fingerprints;
  search the indexed fingerprint identifiers for matches with the remaining plurality of fingerprints associated with the requested data;
  load the identified pages into memory; and
  encoding the requested data using the loaded pages.

17. A non-transitory machine-readable medium as in claim 16, wherein the sets of instructions which, when further executed by the machine, cause the machine to:
  analyze the data request to determine if a protocol associated with the data request can be identified.

18. A non-transitory machine-readable medium as in claim 17, wherein the sets of instructions which, when further executed by the machine, cause the machine to:
  in response to identifying the protocol associated with the data request, parse out the protocol's header data from the file data.

19. A non-transitory machine-readable medium as in claim 18, wherein the sets of instructions which, when further executed by the machine, cause the machine to:
  determine that the file data size is above a file size threshold; and
  in response to the file data being above a file size threshold, utilize an aligned mode for storing the file data within the dictionary pages.

20. A non-transitory machine-readable medium as in claim 19, wherein the aligned mode includes storing the file data such that files within the file data terminate at memory page boundaries.

\* \* \* \* \*